United States Patent [19]
Kyushima et al.

[11] Patent Number: 5,546,559
[45] Date of Patent: Aug. 13, 1996

[54] CACHE REUSE CONTROL SYSTEM HAVING REUSE INFORMATION FIELD IN EACH CACHE ENTRY TO INDICATE WHETHER DATA IN THE PARTICULAR ENTRY HAS HIGHER OR LOWER PROBABILITY OF REUSE

[75] Inventors: Ichiro Kyushima; Masahiro Kainaga, both of Yokohama, Japan

[73] Assignee: Hitachi, Ltd., Tokyo, Japan

[21] Appl. No.: 252,413

[22] Filed: Jun. 1, 1994

[30] Foreign Application Priority Data

Jun. 7, 1993 [JP] Japan .................................. 5-163148

[51] Int. Cl.$^6$ ...................................................... G06F 12/00
[52] U.S. Cl. .................. 395/460; 395/463; 364/243.41; 364/246.11; 364/246.12; 364/246.13; 364/DIG. 1; 364/964.2; 364/964.5; 364/964.342; 364/964.341
[58] Field of Search .................................. 395/425, 400, 395/460, 463

[56] References Cited

U.S. PATENT DOCUMENTS

| | | | |
|---|---|---|---|
| 4,513,367 | 4/1985 | Chan et al. | 395/425 |
| 4,680,730 | 7/1987 | Omoda et al. | 395/425 |
| 4,914,582 | 4/1990 | Bryg et al. | 395/425 |
| 5,043,885 | 8/1991 | Robinson | 395/425 |
| 5,313,609 | 5/1994 | Baylor et al. | 395/425 |
| 5,325,509 | 6/1994 | Lautzenheiser | 395/425 |
| 5,357,618 | 10/1994 | Mizra et al. | 395/425 |
| 5,406,504 | 4/1995 | Denisco et al. | 364/580 |
| 5,432,918 | 7/1995 | Stamm | 395/425 |

FOREIGN PATENT DOCUMENTS 3-58252  3/1991  Japan .

OTHER PUBLICATIONS

Lee, King. "On the Floating Point Performance of the i860™ Microprocessor," International Journal of High Speed Computing, vol. 4, No. 4, 1992, pp. 251–267. (English).

Information Processing, vol. 33, No. 11, 1992, pp. 1348–1357 (Japanese).

*Primary Examiner*—Meng-Ai An
*Attorney, Agent, or Firm*—Fay, Sharpe, Beall, Fagan, Minnich, & McKee

[57] ABSTRACT

A control system for a cache provided between a central processing unit and a main memory. The control system includes a plurality of entries each having a data area and a control information area. A reuse information field in the control information area is set at the same time as a load/store instruction from the central processing unit. When the central processing unit issues an access instruction to desired data in the main memory, an entry storing the desired data to be accessed is searched from a plurality of entries of the cache. If the desired data is not present in any of the plurality of entries, the desired data is read from the main memory. Then, an empty entry is searched from the plurality of entries. If there is no empty entry, an entry is selected which is not set with the reuse information in the control information area of the entry, the reuse information instructing to preferentially maintaining the data in the data field of the entry. The data of the selected entry is replaced by the data read from the main memory. Reuse information in an access command from the central processing unit for maintaining data in a particular entry is set to the reuse information field.

9 Claims, 7 Drawing Sheets

FIG. 10

```
int s,a[1024][1024], b[1024];                    ~901
FOR (i=0; i<1024; i+=2)                          ~902
    FOR (j=0; j<1024; j++){                      ~903
        LOAD(ro, &a[i][j]);                      ~904
        LOAD(r1, &a[i+1][j]);                    ~905
        LOAD(r2, &b[j]);                         ~906
        s=s+ro+r1+r2;                            ~907
    }                                            ~908
```

FIG. 11

```
int s,a[1024][1024], b[1024];                         ~1001
FOR (i=0; i<1024; i+=2)                               ~1002
    FOR (j=0; j<1024; j++){                           ~1003
        LOAD(ro, &a[i][j], NO_REUSE);                 ~1004
        LOAD(r1, &a[i+1][j], NO_REUSE);               ~1005
        LOAD(r2, &b[j], REUSE);                       ~1006
        s=s+ro+r1+r2;                                 ~1007
    }                                                 ~1008
```

CACHE REUSE CONTROL SYSTEM HAVING REUSE INFORMATION FIELD IN EACH CACHE ENTRY TO INDICATE WHETHER DATA IN THE PARTICULAR ENTRY HAS HIGHER OR LOWER PROBABILITY OF REUSE

BACKGROUND OF THE INVENTION

The present invention generally relates to a cache, and more particularly to a cache control system and method suitable for preferentially maintaining data frequently used by a program to be loaded in a cache.

A cache is a memory having a small capacity and a high access speed for compensating for a gap between a high speed CPU and a low access speed main memory (hereinafter simply called a memory).

The relationship between a CPU, a cache, and a memory is briefly illustrated in FIG. 2. In referring to the memory contents during the execution of a program, CPU accesses the data if it is present in the cache, and if not, CPU accesses the memory. The cache is generally placed very near to CPU and operates at a high speed. Therefore, if most of data required by CPU is present in the cache, very high speed data processing can be expected.

It is necessary for the effective cache operation to hold data at a frequently accessed address in the cache. Most of the patterns of memory accesses by a general program often has the following features.

1. Data once accessed at a certain address is accessed again after a relatively short time.

2. Data accessed in a predetermined time period distributes at relatively near addresses.

The former feature is called "time locality", and the latter is called "space locality".

The former time locality signifies that "an address once accessed will be accessed again in the near future". Therefore, if data once accessed is held in the cache, the access time to the data when the address is again referred, can be shortened because the data is in the cache. From this reason, if data referred to by CPU is not in the cache, the data is necessarily stored in the cache to prepare for the next reference to the data.

A cache also uses the latter space locality. The space locality signifies that "if an address is accessed once, addresses near the accessed address are accessed in the near future". Therefore, if new data is read from a memory, not only this data but also other data at near addresses are stored in the cache. It occurs often that when a near address is accessed in the future, an access time to the data is shortened because the data is present in the cache.

A cache is divided into lines of a predetermined length (several tens bytes to several hundreds bytes). Data transfer between a cache and a memory is performed in the unit of one line. For example, when one data is read from a memory, nearby data corresponding to one line is held in the cache.

A cache is effective for shortening a memory access time. However, it may become wasteful if a program without locality is used. Consider for example the following program. In the program, "float" means a declaration of floating point data, and i ++ means i added with +1.

```
float a[1000];
for (i = 0; i < 100: i + +) {
    ... a[i * 10] ...
}
```

References to the array a will be explained. The elements of the array a referred to by the program are a[0], a[10], a[20], ..., a[999]. Each time a different element is referred, and so there is no time locality.

In the case of space locality, if one line of a cache has 32 bytes and an array element is 4 bytes, one line can store only eight array elements. In the exemplary program accessing every tenth data, the data in one line excepting first accessed is not used at all. There is therefore no space locality (assuming that the size of space is 32 bytes).

In order to avoid such wasteful loads to a cache, a processor has been provided which has a function (instruction) called a cache bypass. This function allows a memory access instruction to read data directly from the memory without loading the data to the cache even if it is not present in the cache.

If it is known in advance that data load to a cache is wasteful as in the case of a reference to the array a by the exemplary program, a cache bypass instruction is used so as not to load an element of the array a in the cache.

A processor having such a function is described, for example, in "On the Floating Point Performance of the i860 Microprocessor", by K. Lee, International Journal of High Speed Computing, Vol. 4, No. 4 (1992), pp. 251–267.

An explanation of a general cache technique is disclosed, for example, in "Information Processing", Vol. 33, No. 11 (1992), pp. 1348–1357.

With the above-described conventional techniques, however, even a program having both space locality and time locality cannot effectively use a cache in some cases. These cases will be explained in connection with the following program.

```
float a[100], b[1000] [100];
for (i = 0; i < 1000; i + +) {
    for (j = 0; j < 100: j + +) {
        ... a[j] ...
        ... b[i] [j] ...
    }
}
```

This program includes a double-loop and refers to two arrays a and b. The array a is a one-dimensional array having a size of 100*4=400 bytes, and the array b is a two-dimensional array having a size of 1000 *100*4=400 Kbyte. Assuming that the size of a cache is 32 Kbyte, it is impossible to load all these data in the cache.

In the case of the array a, 100 elements including a[0], a[1], a[2], ..., a[99] are referred in the inner loop. These references are repeated 1000 times in the outer loop, by referring to the same element 1000 times. As a result, the reference to the array a has a high possibility of having both time locality and space locality (because consecutive addresses are sequentially accessed).

Since the size of the array a is smaller than the cache size, all the elements of the array a can be loaded in the cache. As a result, once an array element is loaded in the cache, the remaining 999 references to the element are all ideally a cache hit (data is present in the cache).

In the case of the array b, 1000*100=100000 elements including b[0][0], b[0] [1], ..., b[0] [99], b[1] [0], b[1] [1], ..., b[1] [99], b[2] [0], b[2] [1], ..., b[999] [99] are sequentially referred in the both loops. In this case, although the same element is not referred twice and so there is no time locality, the cache can operate effectively because there is space locality.

Specifically, assuming that one line of the cache can load eight array elements, when one element (e.g., b[0] [0]) is referred, the succeeding seven elements (b[0] [1], ..., b[0] [7] are also loaded in the cache so that the following seven references are a cache hit.

Since the size of the array b is larger than the cache size, all the elements of the array b cannot be loaded in the cache. As a result, the old data in the cache becomes necessary to be replaced by new data.

In such a case, there occurs an issue of which old data is to be replaced. In the case of the above exemplary program, it is better to replace the data in the array b than to replace the data in the array a, because each element of the array a is referred a number of times, the data in the array b is referred only once.

Data in a conventional cache has been replaced in accordance with a random replacement rule or a least recently used (LRU) replacement rule. With a random replacement rule, a replacement entry is randomly selected in the literal sense, considering the data use state not at all.

With the LRU replacement rule, data in a cache accessed earliest is replaced. In other words, whether data in the cache is replaced or not is determined from the past data reference state.

A cache memory controller is disclosed in Japanese Patent Laid-open (kokai) Publication JP-A-3-58252 filed on Jul. 27, 1989. This cache memory controller provides a cache with a load priority address table. The table stores load priority bits indicating whether each address area in the cache is to preferentially store data or not. In accordance with the contents of the load priority address table, the order of replacing cache lines is determined.

In any one of the above-described conventional techniques, data in a cache to be replaced is selected either randomly or by mechanically applying a particular local rule independently from a program. It is not intended therefore to preferentially hold desired data in a cache if the data is supposed, from the contents of a program, to be used in the near future. As a result, in the case of the above-described program, it is not ensured that data of the array b of the cache is replaced and data of the array a is maintained.

The conventional techniques are therefore unable to replace particular data in a cache (e.g., data supposed from a program to be replaced in the near future).

Furthermore, it is unable for a programmer or compiler to instruct not to replace particular data in a cache having a high possibility of reuse.

As described above, a conventional cache is not effectively used (less cache hit) in some cases, depending upon the contents of a program.

SUMMARY OF THE INVENTION

It is an object of the present invention to provide a cache control system and method capable of not replacing particular data in a cache as much as possible.

It is another object of the present invention to provide an information processing system with a cache allowing a programmer or compiler to instruct not to replace particular data in a cache as much as possible.

A cache control system according to the present invention includes a plurality of entries provided in a cache each having a data area and a control information area, a reuse information setting field provided in the control information area and used for determining whether data in the data area of each entry is preferentially maintained or not, reuse information set in a command from a central processing unit for instructing to maintain data in a particular entry, and a unit for preferentially selecting an entry having the reuse information not set in the reuse information setting field when one of data in a plurality of entries is replaced by another.

In a cache control method according to the present invention, when a central processing unit issues an access instruction to desired data in a main memory, an entry storing the desired data to be accessed is searched from a plurality of entries of the cache. If the desired data is not present in any of the plurality of entries, the desired data is read from the main memory. Then, an empty entry is searched from the plurality of entries. If there is no empty entry, an entry is selected which is not set with reuse information in a control information area of the entry, the reuse information instructing to preferentially maintaining the data in the data field of the entry. The data of the selected entry is replaced by the data read from the main memory. Reuse information in an access instruction from the central processing unit for maintaining data in a particular entry is set to the reuse information setting field.

An operation of executing the above-described program in accordance with the present invention will be described.

The program includes accesses to elements of the two arrays a and b in the program loops. An instruction for accessing (loading) an element (data) of the array a has a code for designating that the data in the cache is not replaced as much as possible, whereas an instruction for accessing to an element of the array b has no such a designation code. This code is added by a programmer or compiler.

A memory access instruction has a bit representative of such a designation code. If a memory access instruction contains such a designation code, reuse information is added to an entry of the cache in which data fetched from the memory is loaded, the reuse information indicating that the data in the entry of the cache is not replaced as much as possible. The reuse information is set to a cache entry which loads data in the array a, and is not set to a cache entry which loads data in the array b.

When it becomes necessary to replace old data in a cache entry by new data, the entry of the cache without the reuse information is preferentially replaced. In the exemplary program, an entry which loads data of the array a is not replaced, but an entry which loads data of the array b is replaced.

In the above manner, there is provided a cache capable of not replacing particular data in the cache as much as possible.

There is also provided an information processing system with a cache capable of allowing a programmer or compiler to instruct not to replace particular data in the cache as much as possible.

BRIEF DESCRIPTION OF THE DRAWINGS

FIG. 9 shows an example of a program involving accesses to a cache, with reference to which a cache operation will be described;

FIG. 10 shows the program of FIG. 9 expressed in machine language like form, the program being used for explaining a conventional cache operation; and FIG. 11 shows the program of FIG. 9 expressed in machine language like form, the program being used for explaining a cache operation of the invention.

DESCRIPTION OF THE PREFERRED EMBODIMENTS

An embodiment of the present invention will be described with reference to the accompanying drawings.

Figure 2:
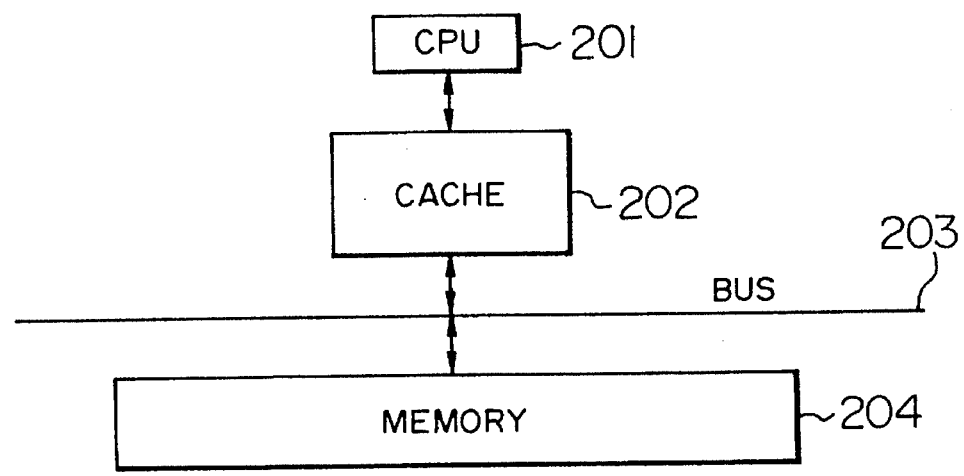
FIG. 2 is a schematic diagram showing an information processing computer system to which the present invention is applied.

FIG. 2 is a schematic block diagram of an information processing system with a cache according to the present invention.

A cache 202 is a memory having a small capacity and a high access speed, and a main memory 202 (hereinafter simply called a memory) is a memory having a large capacity and a low access speed. The cache and memory are both connected to a bus 203, and a CPU 201 is connected via the cache 202 to the bus 203. In executing a program, CPU accesses data in the cache 202 if it is present in the cache 202, or accesses data in the memory 204 if it is not present in the cache 202. A conventional cache is also configured as shown in FIG. 2.

Figure 3:
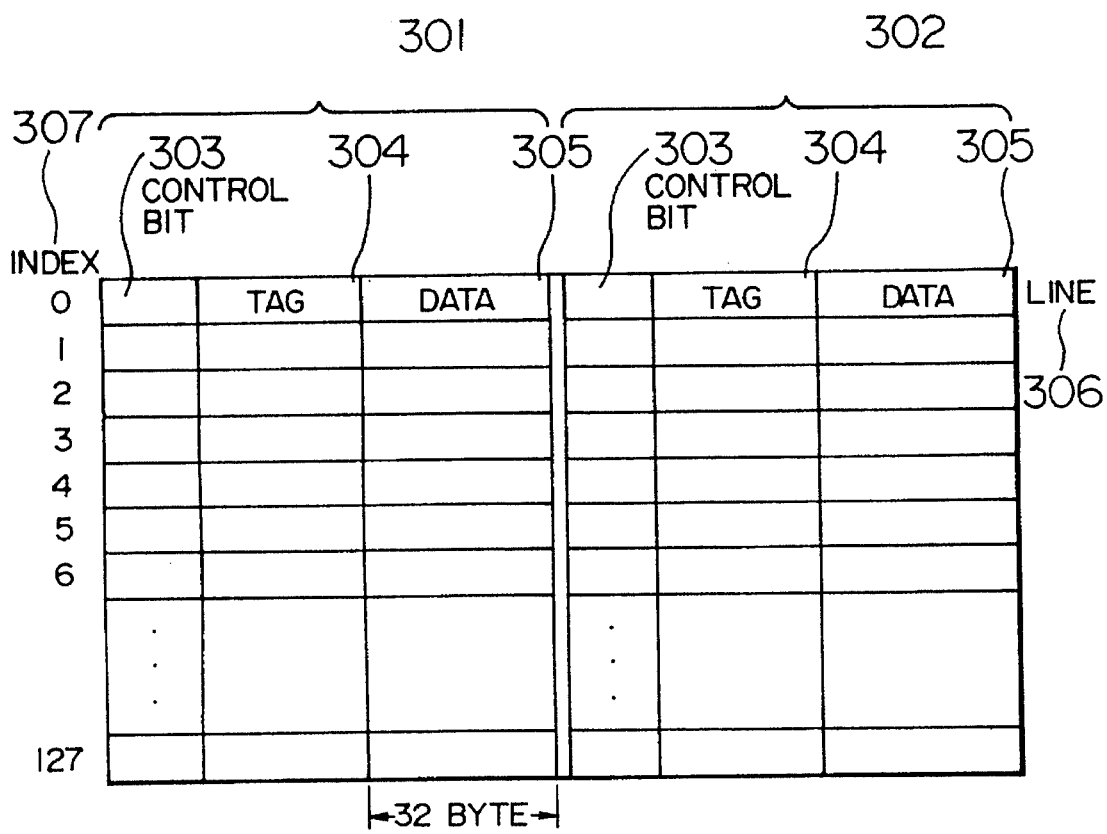
FIG. 3 shows the structure of a cache according to an embodiment of the invention.

FIG. 3 shows the structure of a cache according to an embodiment of the invention.

This cache is a two-way set associative cache (having a first set 301 and a second set 302). The capacity of the cache is 8 Kbyte in total, each set having a capacity of 4 Kbyte. Data is stored in the cache in the form of an array and in the unit of a line.

Each set has 128 lines (entries) 306 from the 0-th to 127-th lines. The number of each line is called an index 307. One line stores data of 32 bytes (32* 128=4096 bytes). One entry can store eight words assuming that one word is constituted by four bytes.

One line has three fields including a control bit field 303, a tag field 304, and a data field 305. These fields will be explained with reference to FIG. 4.

Figure 4:
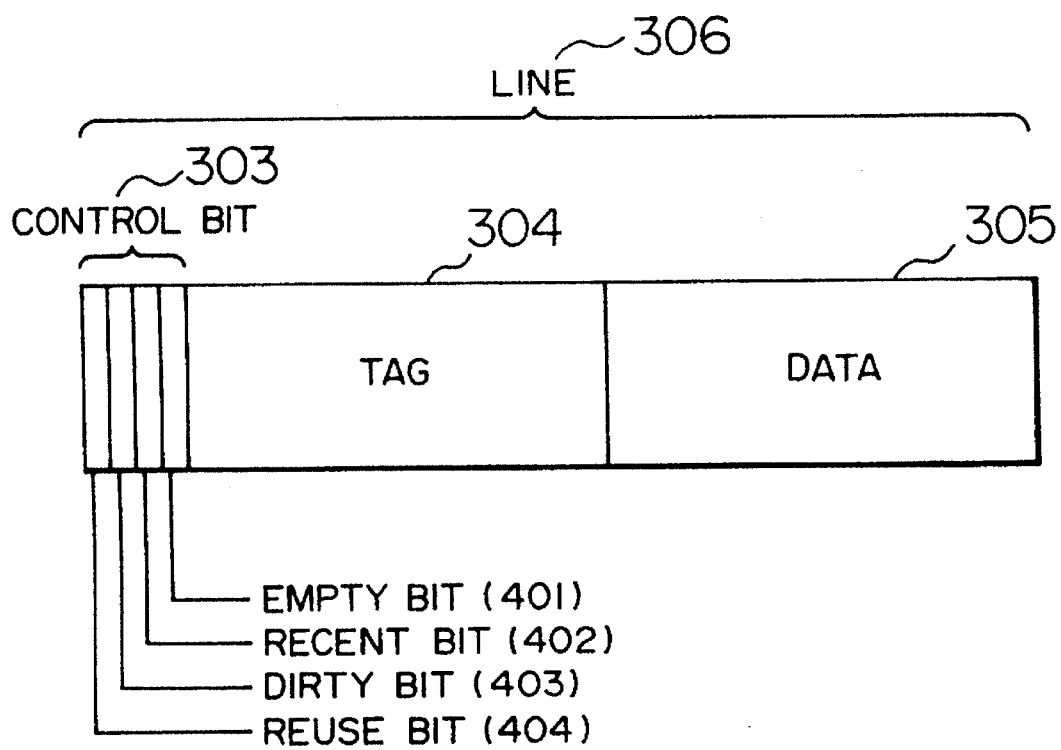
FIG. 4 is a schematic diagram showing one line of the cache shown in FIG. 3.

FIG. 4 shows the structure of one line of the cache of the present invention.

A line 306 has a control information area for storing control information and a data area for storing data. The control information includes "empty" information, "recent" information, "dirty" information, and "reuse" information. In this embodiment, each information is one-bit information. The control information area stores control bits 303. In this embodiment, the data area has a tag field 304 and a data field 305. The control bits include an empty bit 401, a recent bit 402, a dirty bit 403, and a reuse bit 404.

The data field loads the values of data stored in the memory. The tag field identifies what memory address the loaded data has.

The empty bit indicates whether the corresponding line is empty or not (true is empty).

The recent bit indicates whether the corresponding line of the set has been accessed later than the corresponding line of the other set, i.e., indicates whether the line has been accessed most recently (true is recent). The recent bit is required because the cache uses an LRU replacement rule.

The dirty bit indicates whether the corresponding line has been rewritten or not (true is rewrite).

The reuse bit indicates whether the data in the corresponding line has a high possibility of being reused in the future. This bit is set by an instruction of referring to the corresponding memory address, and referred when a cache data replacement becomes necessary. This will be detailed later.

Figure 5:
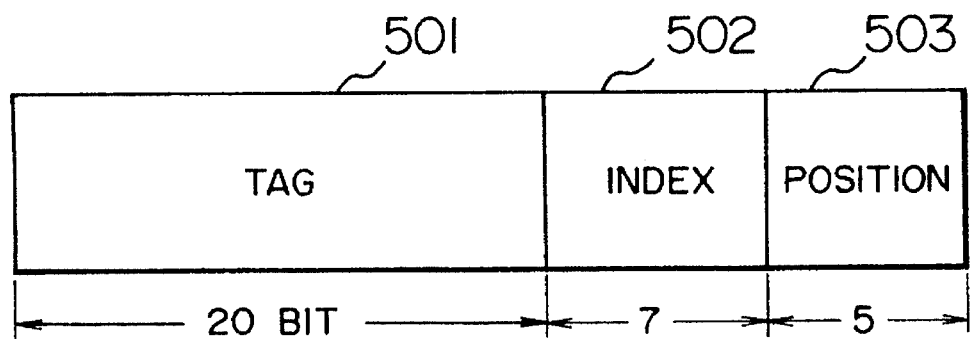
FIG. 5 shows the structure of a memory address according to an embodiment of the invention.

FIG. 5 is a schematic diagram showing the structure of a memory address given by binary representation.

A memory address has 32 bits including three fields of a tag field 501, an index field 502, and a position field 503. The tag field has 20 bits and corresponds to the tag field 304 of a cache line. The index field has 7 bits and identifies a cache line (these seven bits can identify one of 128 ($2^7$=128) cache lines). The position field has 5 bits and identifies a byte position in the data field (these five bits can identify one of 32 ($2^5$=32) bytes).

Figure 6:
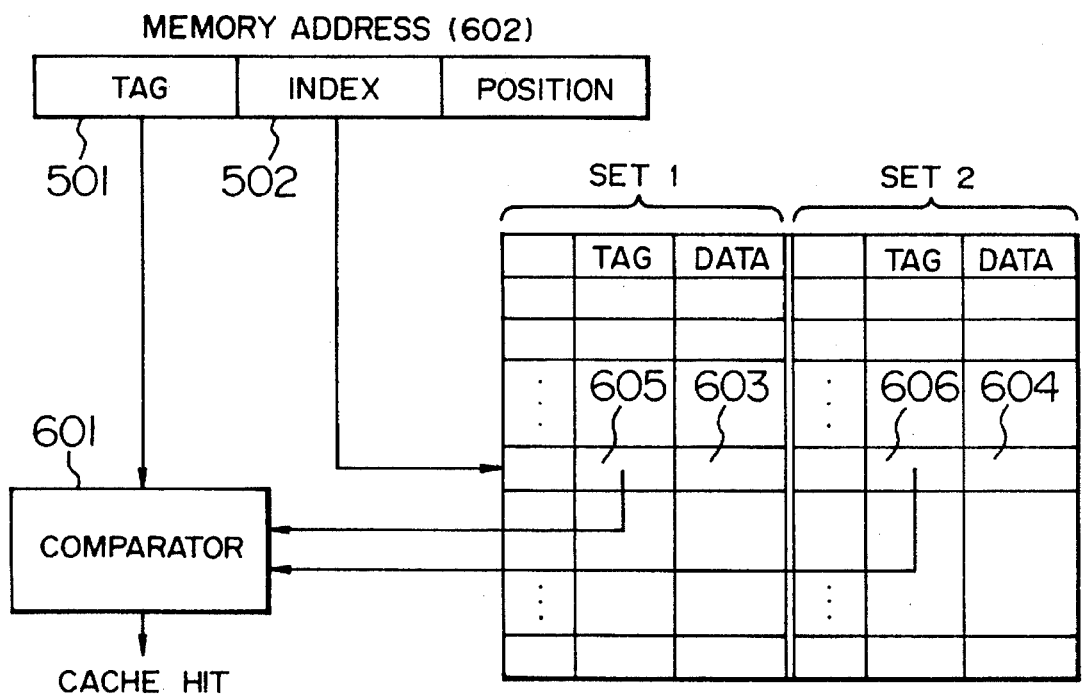
FIG. 6 is a schematic diagram explaining the operation of a cache access according to an embodiment of the invention.

Next, the operation of the cache of the invention when a memory access occurs will be described with reference to FIGS. 6 and 7.

At Step 10, CPU issues a memory access request. At Step 11, an entry of a cache line array is identified by using the index value 502 of the memory address 602. Since this cache is a two-way set associative cache, one index identifies two entries (including the entry 603 of the first set and the entry 604 of the second set).

At Step 12, a comparator 601 compares the tag value 501 of the memory address with the tag values 605 and 606 of the identified entries. If the tag value coincides each other, it is judged that a copy of the memory location contents (data at main memory address) has been stored in one of the two cache entries.

Namely, if the tag value 501 of the memory address is coincide with one of the tag values 605 and 606 of the cache entries, a cache hit occurs at Step 14. In this case, the memory access is passed to a cache access, allowing a high speed access.

If there is no entry having the same tag value, it is judged that a copy of the memory location contents has not been stored in one of the two cache entries. In this case, a low speed memory access instead of a cache access becomes necessary at Step 16.

If there is no copy of the memory location contents in the cache, the data to be read from the memory is loaded in the cache in the following manner.

If there is no entry having the same tag value, the empty control bits of the two entries of the two sets are checked at Step 17. If there is a true entry bit among the two empty bits of the two entries of the two sets, the data read from the memory is loaded in this empty cache entry at Step 19.

Figure 1:
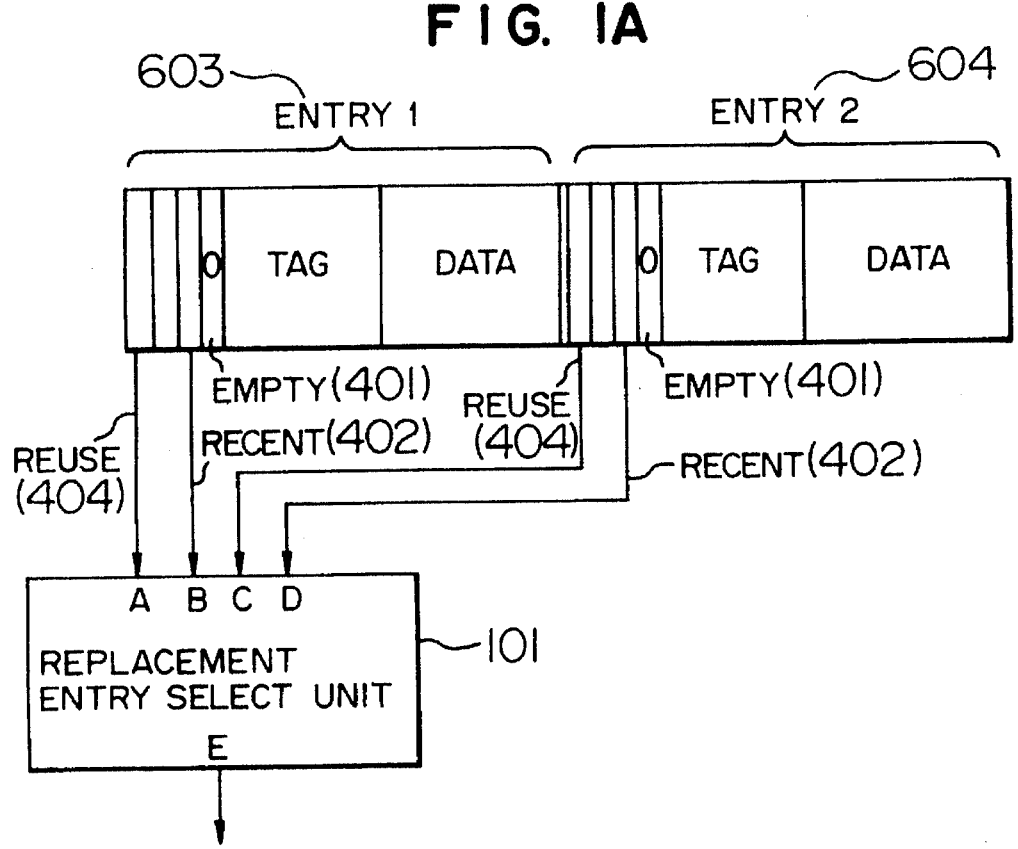
FIGS. 1A and 1B are a schematic diagram showing the structure of a two-way set associative cache and a table explaining the operation of selecting an entry to be replaced, according to an embodiment of the present invention.

If both the empty bits of the two entries are false, one of the data in the two entries in the cache is replaced at Steps 21 and 22. For the selection of one of the data to be replaced, the information of the reuse bit and recent bit is used. FIGS. 1A and 1B are a schematic diagram and a table explaining this selection.

FIGS. 1A and 1B explains how one of the first and second entries 603 and 604 of the two sets is replaced at Step 21.

The first entry 603 belongs to the first set, and the second entry 604 belongs to the second set. The reuse bits and recent bits of the control bits of the two entries of the two sets are supplied to a replacement entry selection unit 101 to select an entry to be replaced. Upon reception of the four bits, the selection unit 101 outputs "0" or "1". "0" stands for the first entry and "1" stands for the second entry.

The relationship between the inputs and outputs of the selection unit 101 is shown in the table 102 of FIG. 1B. The meanings of this table are as follows.

If one of the two sets has a reuse bit "1" (true), the entry of the other set (with reuse bit "0") is selected.

If the reuse bits of both the sets are true ("1") or false ("0"), an older entry (having a false recent bit) is selected. At the initial conditions, both the recent bits of the two sets are false ("0"). However, upon a memory access, one of the sets becomes true ("1") and the other becomes false ("0"), by all means, and both the sets will not become true. If both the recent bits are false, any one of the sets can be selected (in this table, this is indicated by %1).

After the entry to be replaced has been selected, it is checked whether the entry contents have been changed or not (whether the dirty bit is true or not). If the entry contents have been changed, the contents are written in the memory. If not (false dirty bit), the entry contents are not written in the memory.

After the old entry is determined, data in the memory location is read and loaded in the replaced cache entry. The recent bit of this entry is then set to true, and the recent bit of the entry not replaced is set to false.

Figure 7:
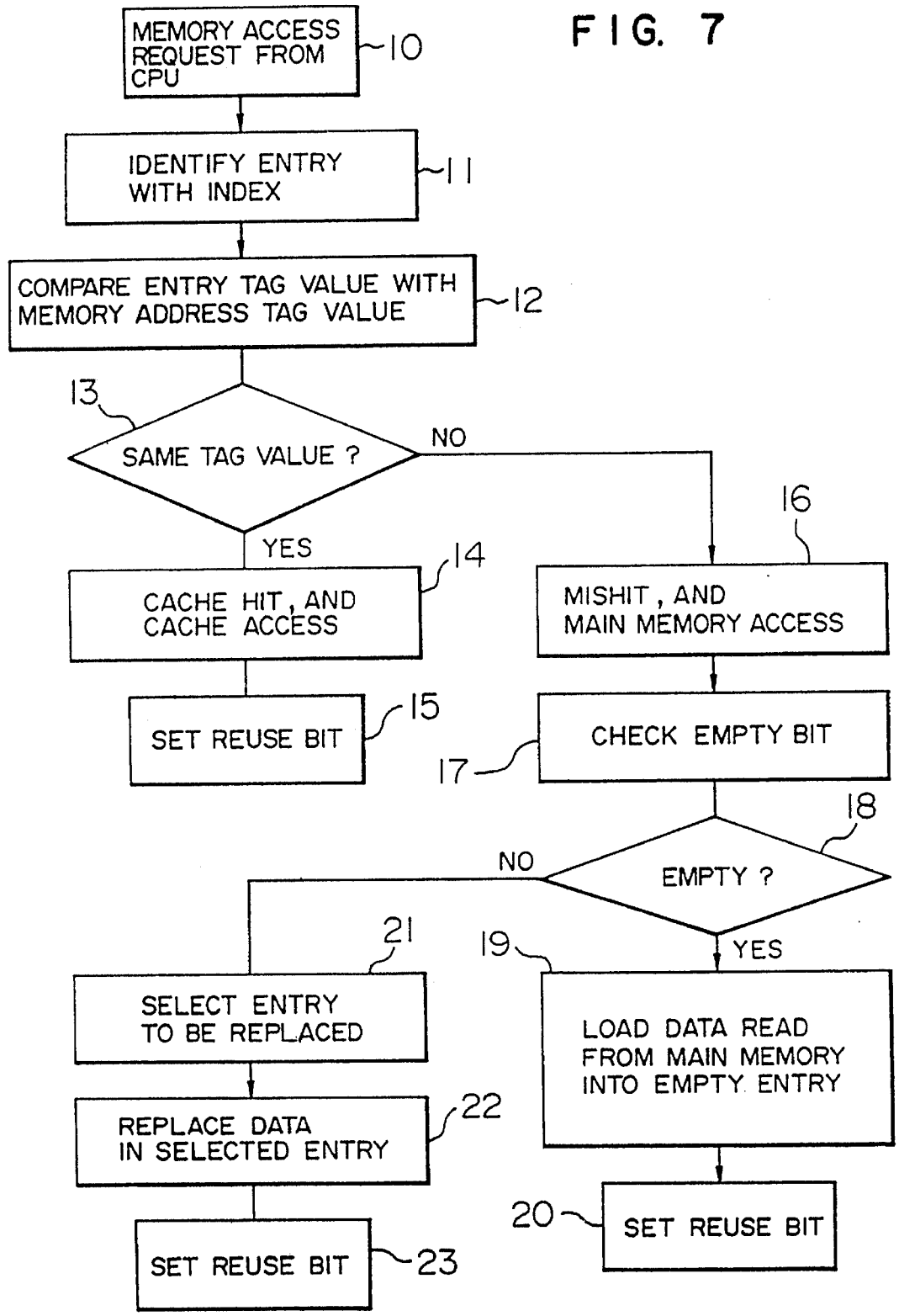
FIG. 7 is a flow chart explaining the operation of a cache control method, including processes from a memory access request to a replacement of data in an entry, according to an embodiment of the invention.

At Steps 15, 20, and 23 in the flow chart shown in FIG. 7, reuse bit information 704 of a CPU load instruction is set to the reuse bit information storage field 404 of the entry.

Figure 8A:
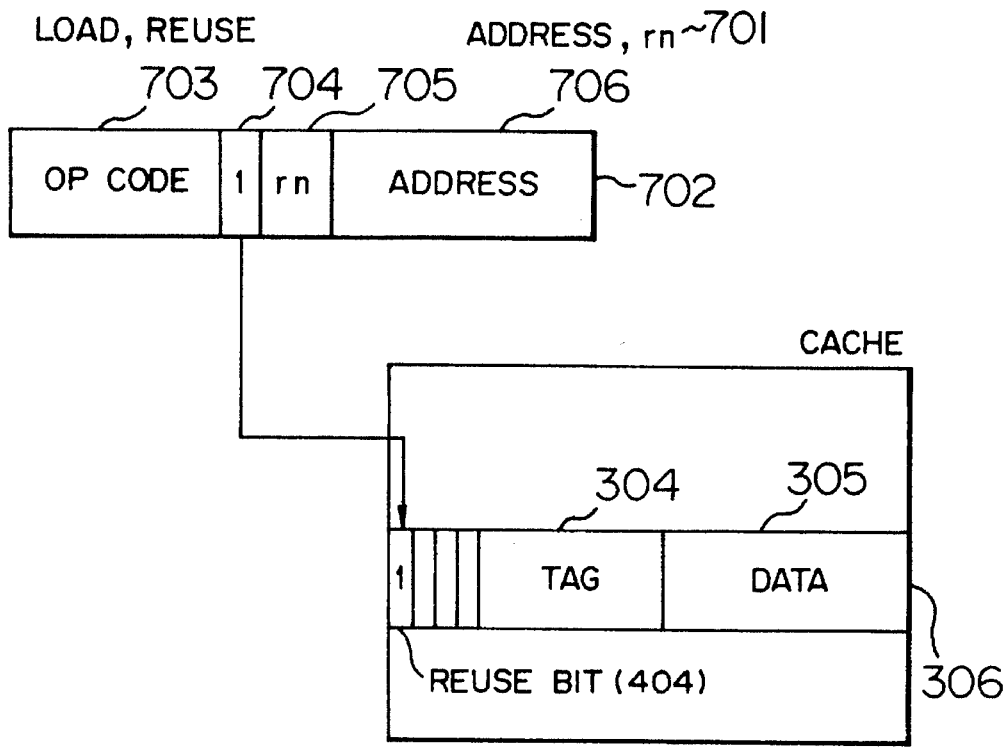
FIGS. 8A and 8B are schematic diagrams explaining the format of a load instruction from CPU and a method of setting reuse information to a cache entry, according to an embodiment of the invention.

FIG. 8A is a schematic diagram showing a load instruction and explaining the operation of setting a reuse bit to a cache entry.

The format 702 of the load instruction contains a bit 704 indicating a reuse designation. If this bit is true, the reuse bit 404 of the cache entry 306 having data accessed by the load instruction is set to true.

Figure 8B:
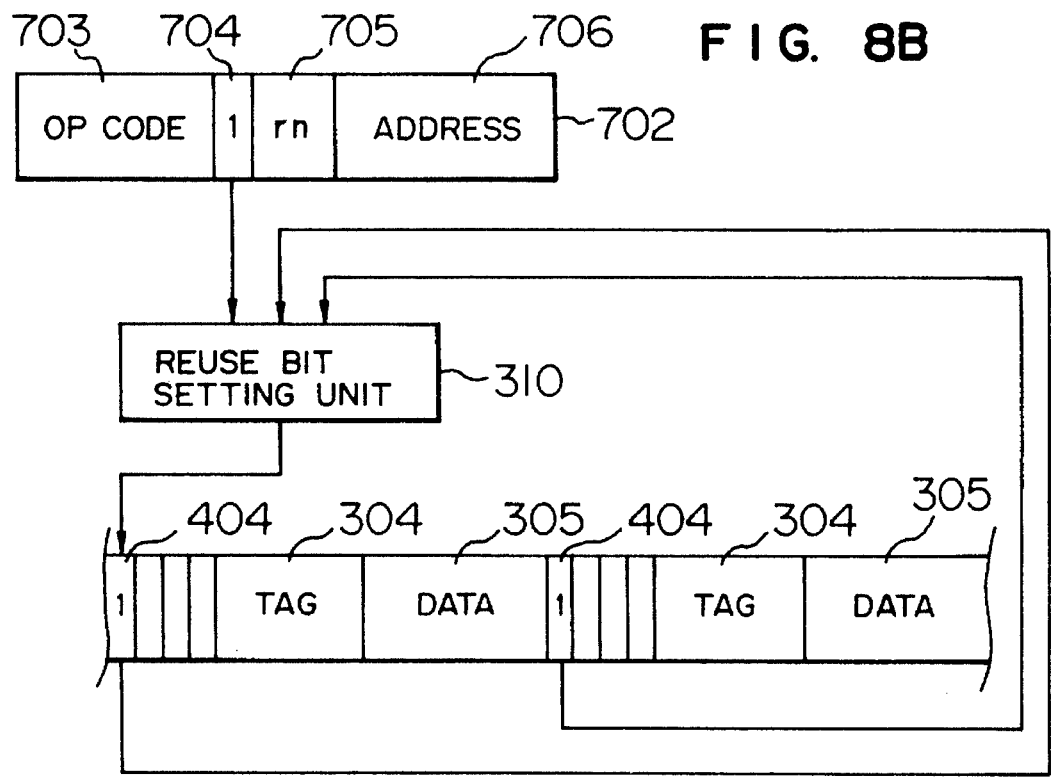

If both the reuse bit information storage areas 404 of the two entry sets are being set to "1" and both the recent bits are being set to "0", any one of the two entries can be selected as shown in the table of FIG. 1B. FIG. 8B is a schematic diagram showing an embodiment wherein there is provided a reuse bit setting unit 310 for selecting one of the two entries under the above-described state.

Next, a difference between the operations of a conventional cache system and the cache system of this invention will be described by using a program shown in FIG. 9 by way of example. Prior to giving the description, conventional cache line control bits and a conventional method of selecting an entry to be replaced will be described briefly. In FIG. 9, "int" is a declaration of an integer (s), and t+=2 means an addition of 2.

The control bits of a cache line of a conventional cache system include an empty bit, a recent bit, and a dirty bit. When a cache line contends, an entry having a false recent bit, i.e., an entry accessed earlier, in the cache is replaced.

In the double-loop of the program shown in FIG. 9, it is assumed that the first iteration (repetition unit, each loop of, for example, 99 loops is called an iteration) of an outer loop 802 has been completed. At this time, the accessed elements in the arrays a and b are a[0 . . . 1] [1 . . . 1023], and b[1 . . . 1023] where b[1 . . . 1023] for example is b[1], b[2], . . . , b[1023].

The access position of the array a changes with the advancement of iteration of the outer loop, whereas the access position of the array b does not change at the outer loop (or strictly speaking, the total capacity of the array b is smaller than the size of the cache). In this context, if the array b [1 . . . 1023] can be loaded in the cache for a long time and reused by each iteration of the outer loop, the load process can be speeded up efficiently.

However, in the case of a two-way set associative cache, the array b cannot always be loaded in the cache. The reason for this is that a cache line contends among the element b[j] of the array b, the element a[1] [j] and element a[i+1] [j] of the array a. This will be clarified in the following. In the two-dimensional array, it is assumed that the second dimension (j) is disposed in the memory so as to change faster than the first dimension.

As shown in FIG. 5, a cache line (index) to which data in the memory at a certain address is loaded is determined by the middle seven bits. If two array elements have the same seven middle bits of their memory addresses, these elements are required to be loaded in the same line (cache line contention). In the case of the two-way set associative cache, there are two entries per one index.

The address of the element b[j] is "the start address (address of b[0]) of the array b+j * 4", and the address of the element a[i] [j] is "the start address (address of a[0] [0]) of the array a+i*4096 +j*4". Therefore, the addresses of a[i] [j] and a[i+1] [j] have a difference of 4096, and the two elements are required to be loaded in the same cache line.

If a difference between the start addresses of the arrays a and b is a multiple of 4096 (this has a high possibility because the size of the array a is 4096 bytes), the elements a[i] [j] and b[j] are required to be loaded in the same cache line.

From the above reasons, a cache line contends among the elements b[j], a[i] [j], and a[i+1] [j].

FIG. 10 shows the program of FIG. 9 expressed in machine language like form. The access to the subject arrays a and b are explicitly written by load (). r0, r1, and r2 represent a register.

In the loops, the array elements are accessed in the order of a[i] [j], a[i+1] [j], and b[j].

The operation of a conventional cache will be described wherein the iteration of the inner loop is fixed (j is a fixed value of J) and the iteration of the outer loop is sequentially increased.

At the first iteration (i=0) of the outer loop, an access to three array elements a[0] [J], a[1] [J], and b[J] contends for the same cache line. With the LRU replacement rule, of the three elements, the two elements a[1] [J] and b[J] are loaded in the cache. The recent bit of the element b[J] is set to true.

At the second iteration (i=2) of the outer loop, an element a[2] [J] is first accessed. At this time, the elements a[1] [J] and b[J] remain in the corresponding entries. In this case, because the element a[1] [J] has a false recent bit, this element in the cache is replaced by the element a[2] [J]. The recent bit of the remaining element b[J] is set to false, whereas the recent bit of the new element a[2] [J] is set to true.

Next, an element a[3] [J] is accessed, and the element b[J] is replaced by the element a[3] [J]. Lastly, an element b[J] is accessed, and the element a[2] [J] in the cache is replaced by the element b[J].

At the third and following iterations of the outer loop, the operations generally the same as the second iteration are performed.

It is to be noted that the element b[J] is once replaced and then newly fetched from the memory. That is to say, at an arbitrary iteration of the outer loop (i is an arbitrary value, and j is an arbitrary value J), the element b[J] is fetched from the memory. This means that the whole array b does not remain in the cache because the value j is arbitrary.

In the above manner, the conventional cache system uses the cache quite ineffectively.

Next, how the cache system of this invention can use the cache effectively will be described by using the program shown in FIG. 9.

FIG. 11 shows the program of FIG. 9 expressed in machine language like form.

In this program, the memory access is explicitly written by load () having a designation of reuse.

The execution of the program of FIG. 11 will be explained by using the cache of the invention. The iteration of the inner loop is fixed (j is a fixed value of J) and the iteration of the outer loop is sequentially increased.

At the first iteration (i=0) of the outer loop, three array elements a[0] [J], a[1] [J], and b[J] contend for the same cache line. With the LRU replacement rule, of the three elements, the two elements a[1] [J] and b[J] are loaded in the cache.

The recent bit of the element b[J] is set to true (the recent bit of the element a[1] [J] is false). An access to the element b[J] designates a reuse 1006 so that the reuse bit of the element b[J] is also set to true.

Also at the second iteration (i=2) of the outer loop, an access to three array elements a[2] [J], a[3] [J], and b[J] is performed. An element a[2] [J] is first accessed, and the element a[1] [J] in the cache is replaced by the element a[2] [J] because both the reuse and recent bits of the element a[1] [J] are false.

Next, the element a[3] [J] is accessed, and either the elements a[2] [J] or b[J] in the cache are replaced. The element a[2] [J] has a false reuse bit and a true recent bit, whereas the element b[J] has a true reuse bit and a false recent bit. Therefore, as shown in FIG. 1B, the entry of the element a[2] [J] is selected to be replaced, and the element b[J] remains in the cache. The element a[3] [J] is thereafter loaded in the cache.

Lastly, the element b[J] is accessed. In this case, the element b[J] is present in the cache (cache hit) so that it is not necessary to access the memory, but this element is accessed from the cache. At this time, the element b[J] has a true recent bit and a true reuse bit.

The third and following iterations of the outer loop are generally the same as the second iteration.

At the third iteration (i=4) of the outer loop, an access to three elements a[4] [J], a[5] [J], and b[J] is performed. The element a[4] [J] is first accessed, and the element a[3] [J] in the cache is replaced by the element a[4] [J].

Next, the element a[5] [J] is accessed, and one of the elements a[4] [J] and b[J] in the cache is replaced. Because the element a[4] [J] has a true recent bit and the element b[J] has a true reuse bit, the element a[4] [J] is replaced by the element a[5] [J].

Lastly, the element b[J] is accessed. In this case, the element b[J] is already present in the cache (cache hit).

It is to be noted that the element b[J] is not fetched from the memory if it is once loaded in the cache. That is to say, once the whole array b is fetched from the memory and loaded in the cache at the first iteration of the outer loop, no fetch occurs thereafter. In other words, an access to the array b makes efficient use of time locality, which is the advantageous feature of this invention.

According to the present invention, each entry of the cache has reuse information instructing that data in the entry of the cache is not displaced as much as possible. Accordingly, in determining which entry of the cache is replaced, the reuse information can be used so that the entry having the reuse information can be preferentially remained in the cache.

Furthermore, in response to an execution of a command for accessing memory data and designating a reuse, the data as well as the reuse designation are set to the entry. Accordingly, a user or compiler can instruct to remain particular data in the cache as much as possible.

In this manner, the number of cache mishits can be reduced.

What is claimed is:

1. A control system for a cache provided between a central processing unit and main storage means, comprising:

a plurality of entries provided in said cache each having a data area and a control information area;

a reuse information field, set by a compiler or a programmer during a data load/store instruction, in each said control information area representative of whether data in said data area of each entry of said plurality of entries is preferentially maintained;

reuse information, contained in an instruction from said central processing unit which is set by the compiler or the programmer, and stored in said reuse information field, for indicating whether data in said data area of each entry has either a high probability of reuse or a low probability of reuse; and means for selecting one of said plurality of entries for replacement, when said one of said plurality of entries is to be replaced by a second data in said main storage, said one entry having said reuse information indicating said one entry has said low probability of reuse.

2. The control system according to claim 1, wherein:

said control information area further includes a replacement information field for storing replacement information, set by said control system, which indicates whether said data in said data area of said entry is to be maintained or replaced according to a replacement rule, and said means for selecting one of said plurality of entries determines said entry based on both said reuse information and said replacement information wherein:

said one entry is selected if said reuse information indicates said one entry does not have said high probability of being reused, and said replacement information indicates said one entry can be replaced.

3. The control system according to claim 2, wherein said entries of said cache and a plurality of storage blocks of said main storage means are mapped by a set associative scheme.

4. The control system according to claim 3, wherein said set associative scheme is a two-way set associative scheme relating a set of two entries to one of said plurality of storage blocks.

5. The control system according to claim 4, wherein said reuse information in said reuse information field comprises one-bit of information.

6. The control system according to claim 5, wherein:

said replacement information field further includes a recent information field containing a recent bit for indicating which entry of the set of two entries which has been accessed more recently, and if said reuse information indicates
both of said set of two entries have a high probability of being reused, and
neither of said set of two entries has a high probability of being reused, said means for selecting one of said plurality of entries selects said one entry of the set of two entries which was accessed earlier.

7. A method for controlling a cache provided between a central processing unit and main storage means, said method comprising the steps of:

when said central processing unit issues an access instruction to retrieve desired data in said main storage means, searching said cache for one of plurality of entries in said cache where said entry stores said desired data to be accessed, each of said plurality of entries in said cache including a data area and a control information area; and if said desired data is not present in any of said plurality of entries in said cache, loading said desired data from said main storage means to said cache comprising the steps of:

reading said desired data from said main storage means;

searching for an empty entry from said plurality of entries;

if there is no empty entry, selecting an entry from said plurality of entries in said cache containing reuse information in said control information area of said entry indicating present data in said data area of said entry has a low probability of being reused;

replacing the present data of a selected entry with said desired data read from said main storage means; and setting said reuse information in the control information area by a compiler or programmer during said access instruction from said central processing unit to indicate said present data in a particular entry has to be maintained.

8. The control method according to claim 7, wherein said step for selecting an entry from said plurality of said entries in said cache selects said selected entry based on another replacement rule if said reuse information for all of said entries indicates all have a same one of a high probability of being reused or said low probability of being reused.

9. The control method according to claim 8, wherein said plurality of entries of said cache and a plurality of storage blocks of said main storage means are mapped by a two-way set associative scheme relating a set of two entries of said plurality of entries of said cache to one of said plurality of said storage blocks, and when said reuse information indicates both of said set of two entries have the same one of said high probability of being reused or said low probability of being reused, said step of selecting an entry from said plurality of entries in said cache selects one entry of the set of two entries which was accessed earlier.

\* \* \* \* \*